April 9, 1963 W. H. SOLOMON 3,084,491
MEANS FOR TRANSPORTING FLEXIBLE SHEETS
Filed May 17, 1960 4 Sheets-Sheet 1

INVENTOR
WILLIAM H. SOLOMON

BY  Price & Heneveld

ATTORNEYS

April 9, 1963   W. H. SOLOMON   3,084,491
MEANS FOR TRANSPORTING FLEXIBLE SHEETS
Filed May 17, 1960   4 Sheets-Sheet 2

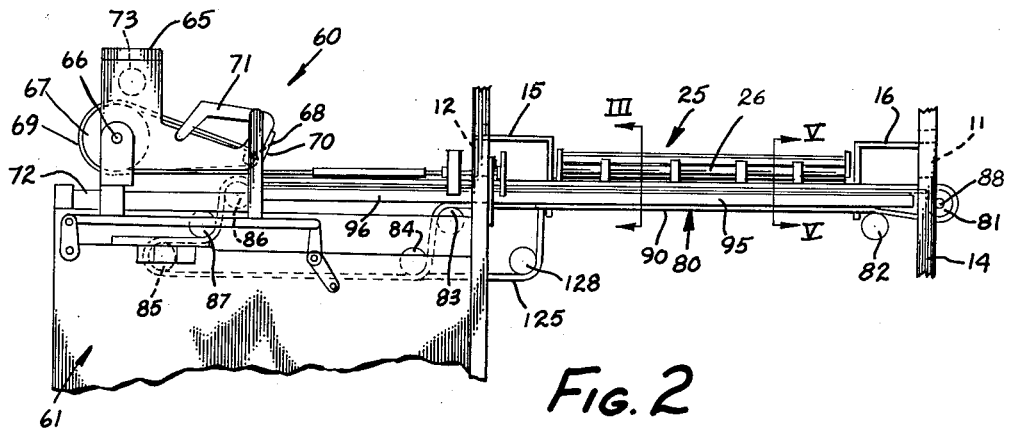

Fig. 2

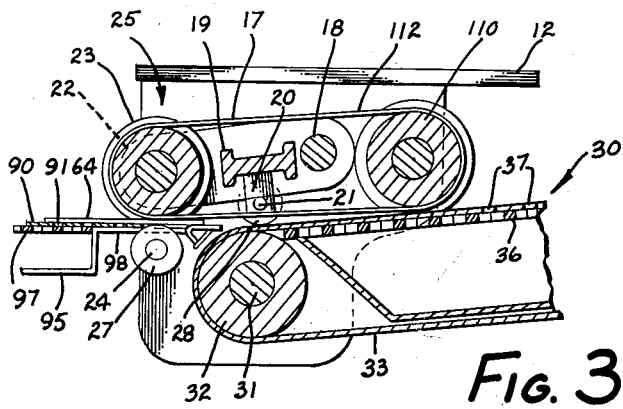

Fig. 3

| | ONE CYCLE | | | | |
|---|---|---|---|---|---|
| | 0-¼ | ¼-½ | ½-¾ | ¾-1 | |
| CUTTER HEAD FEED BELT FEEDS | | | | | |
| CUTTER HEAD FEED BELT STOPPED | | | | | |
| KNIFE OPERATIVE | | | | | |
| KNIFE INOPERATIVE | | | | | |
| CROSS FEED CONVEYOR FEEDS | | | | | |
| CROSS FEED CONVEYOR STOPPED | | | | | |
| ANGLE CONVEYOR STOPPED | | | | | |
| ANGLE CONVEYOR FORWARD | | | | | |
| ANGLE CONVEYOR REVERSE | | | | | |
| ELEVATOR DOWN | | | | | |
| ELEVATOR RISING | | | | | |
| ELEVATOR UP | | | | | |
| ELEVATOR LOWERING | | | | | |
| TRANSFER ROLLER FEEDS | | | | | |
| TRANSFER ROLLER STOPPED | | | | | |
| TRANSFER ROLLER DOWN | | | | | |
| TRANSFER ROLLER UP | | | | | |

Fig. 9

INVENTOR
WILLIAM H. SOLOMON
BY Price & Heneveld
ATTORNEYS

April 9, 1963 W. H. SOLOMON 3,084,491
MEANS FOR TRANSPORTING FLEXIBLE SHEETS
Filed May 17, 1960 4 Sheets-Sheet 3
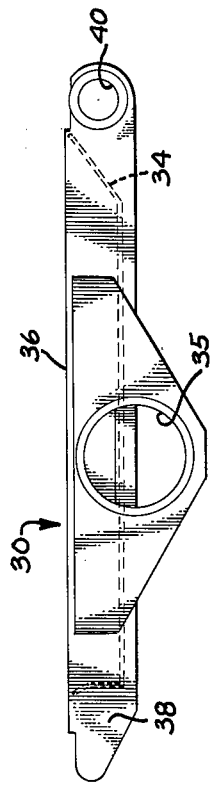
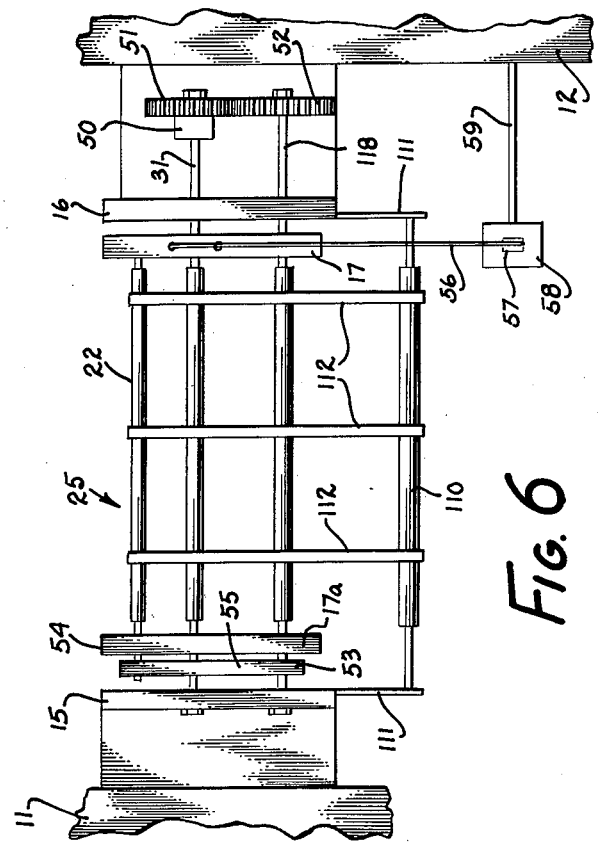
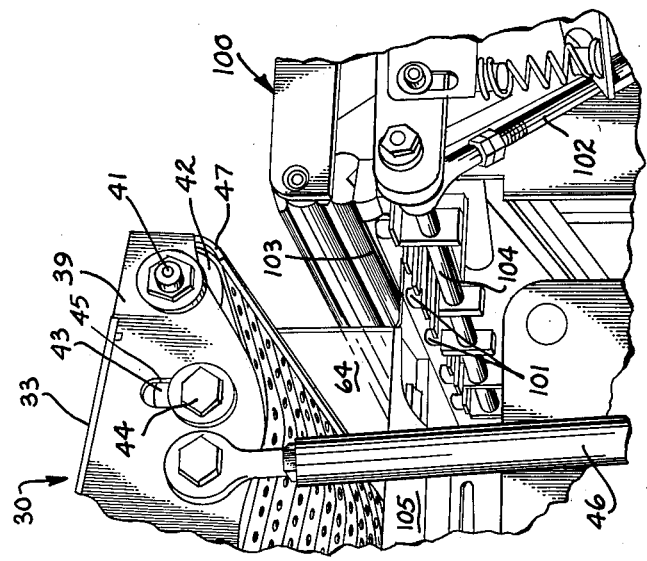
INVENTOR
WILLIAM H. SOLOMON
ATTORNEYS April 9, 1963 W. H. SOLOMON 3,084,491
MEANS FOR TRANSPORTING FLEXIBLE SHEETS
Filed May 17, 1960 4 Sheets-Sheet 4

INVENTOR
WILLIAM H. SOLOMON

BY *Price & Heneveld*

ATTORNEYS

United States Patent Office 3,084,491
Patented Apr. 9, 1963

3,084,491
MEANS FOR TRANSPORTING FLEXIBLE SHEETS
William H. Solomon, Grand Rapids, Mich., assignor to Oliver Machinery Company, Grand Rapids, Mich., a corporation of Michigan
Filed May 17, 1960, Ser. No. 29,731
4 Claims. (Cl. 53—389)

This invention relates to mechanism for transporting sheets of highly pliable material, and more particularly to means for transporting such sheets to various stations in an automatic packaging machine.

Previously, the transportation of sheet wrapping material such as cellophane or ordinary wrapping paper has not presented a problem, since these materials are stiff enough to be pushed from point to point. However, with the discovery of new materials suitable for wrapping, materials handling problems have developed. Highly flexible materials such as "Pliofilm," "Cryovac" film, polyethylene and others are so pliable that they cannot be successfully transferred from point to point by pushing mechanisms.

Applicant has overcome this problem by a novel mechanism which in effect pulls the flexible sheet material from station to station. This is accomplished by applying suction means to moving conveyors which transport the highly flexible film, whereby the film adheres to the conveyor surface and moves therewith.

Inherent in the above problems is the difficulty in transferring a highly pliable sheet from movement in one direction to movement in a direction normal to its original direction. Any means which tends to push the material is inoperative since the material will bunch up and buckle. The present invention provides means whereby transfer in the normal direction is accomplished by a rotating mechanism which pulls the sheet in the normal direction. This transfer is assisted by take-off conveyor means which also have suction means applied thereto, causing the sheet to adhere thereto and move quickly and evenly.

Another problem encountered with flexible plastic film is the fact that such a film is sufficiently elastic to be appreciably deformed when tension is applied thereto. The present invention therefore provides for a tension-regulating mechanism which assures that the film is kept under constant tension as it passes under the cutting knife, so that the desired dimensions of the cut sheets can be accurately maintained.

It is therefore the primary object of this invention to provide a simple and effective mechanism for automatically transporting and handling individual sheets of plastic film.

It is also an object of this invention to provide means for applying constant tension to a strip of highly flexible material while feeding it from a storage roll through a cutting device so as to assure dimensional stability and accuracy of the cut.

Another object of this invention is to provide conveyor means employing suction and a speed differential to pull highly flexible material onto the conveyor under constant tension.

Still another object of this invention is to provide suction conveyor means for moving sheets of highly flexible material.

Yet another object of this invention is to provide transfer means for moving highly flexible material off a suction conveyor in a lateral direction at a point of transfer.

It is a further object of this invention to provide a transporting mechanism for plastic film constructed of material which reduces the clinging effects caused by static electricity generated by friction between the highly flexible material and the transporting mechanism.

Yet another object of this invention is to provide conveyor means for packaging machines which can be reversed in direction when highly flexible material carried thereby is being removed therefrom by the packaging mechanism, to maintain tension on said highly flexible material.

The aforementioned and other advantages in the practice of this invention will be more apparent from the description of the specification taken in conjunction with the appended drawings, wherein:

FIG. 2 is an end elevational view of the package wrapping machine with details of the packing apparatus removed and showing the cross-feed conveyor belt and transfer mechanism.

FIG. 3 is a cross sectional view taken along the section line III—III of FIG. 2.

FIG. 4 is a side elevational view of the angle conveyor mechanism frame showing the vacuum box formed as a part thereof.

FIG. 5 is a segmental perspective view of the angle conveyor means and package wrapping lift mechanism.

FIG. 6 is a schematic view of the drive mechanism for the angle conveyor assembly and transfer assembly.

FIG. 9 is a chart showing the sequence of operation of the various components of the mechanism of this invention.

Figure 1:
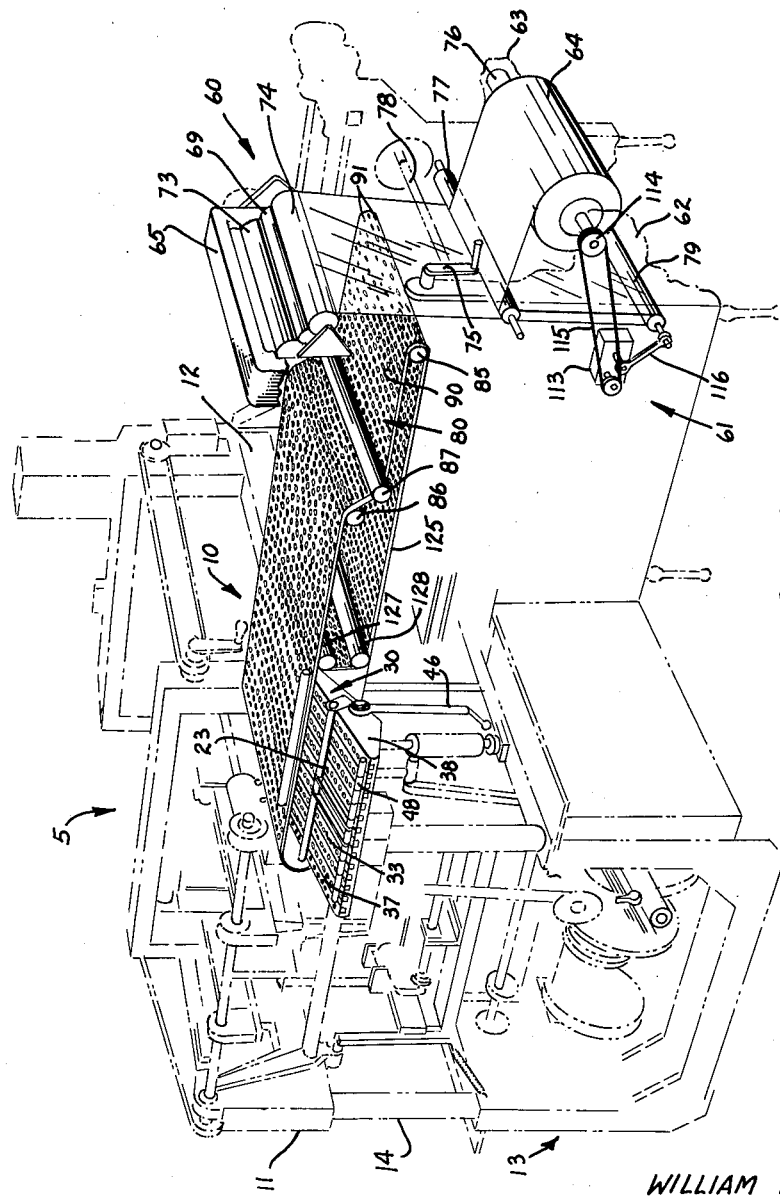
FIG. 1 is a perspective view showing a package wrapping machine in phantom lines and the transfer mechanism according to this invention associated therewith in solid lines.

Basically, this invention relates to a transporting mechanism for conveying highly flexible materials, such as polyethylene, in sheet form such as is required, for example, in an automatic package wrapping machine. The flexible material is stored in the form of a roll rotatably supported by the frame of the machine. The roll is power-driven through a control device responsive to the tension of the plastic film so as to maintain the film under a constant tension while it is being unrolled and fed through the cutter mechanism. From the tension control device, the material is fed by an endless cutter head feed belt to a cutting station. Immediately beyond the cutting station, the film drops onto a perforated cross-feed belt having suction means applied thereto, and traveling at a greater speed than the cutter head feed belt. The cross-feed belt pulls the flexible material from the feed belt and, due to its greater speed, spaces the cut sheets of material from the end of the uncut film strip. Movement of the cross-feed conveyor belt and feed belt is terminated and the next sheet of flexible material is severed from the film strip by appropriate cutting means while the belts are stopped. When the belts resume their movement, the cut sheet of material is conveyed by the cross-feed belt to a transfer point. The suction means applied to the cross-feed conveyor belt causes the flexible sheet material to adhere to the belt and to be carried thereon to the transfer point. When the sheet reaches the transfer point, the cross-feed belt stops. A transfer mechanism including a pivotally mounted rotating roller is lowered upon the edge of the flexible sheet. The roller rotates in a direction so as to pull the sheet laterally off the cross-feed belt. The roller discharges the sheet onto an angle conveyor, likewise equipped with suction means, which accepts the flexible sheet and transfers it to the package wrapping station. The peripheral speed of the angle conveyor belt is greater than that of the transfer roller and thus assists in transferring the sheet laterally from the cross-feed belt. The flexible sheet is carried to the package wrapping mechanism by the angle conveyor belt where the leading edge of the sheet is grasped by the fingers of a conventional package wrapping device. The direction of travel of the angle conveyor belt may be reversed when the edge of the flexible material has been grasped by the packaging mechanism fingers, in order to provide the proper wrapping tension to the flexible material and maintain it until the trailing edge of the sheet is pulled off the angle conveyor in the course of the wrapping operation. The above material handling operations take place in a predetermined sequential manner illustrated in FIG. 9, so as to provide a continuous flow of sheets to the packaging apparatus.

This invention is concerned basically with mechanism for transporting highly flexible sheet material from a point of storage to a point of use such as a package wrapping mechanism designated generally as 5. The transporting mechanism assembly is designated generally as 10. The assembly 10 includes the material storage and cutter mechanism designated generally as 60, a cross-feed conveyor belt assembly designated generally as 80, a transfer mechanism designated generally as 25, and an angle conveyor means designated generally as 30. The transport assembly 10 has its setting in an environment of package wrapping mechanism which per se is not a part of this invention, but will now be described briefly.

FIG. 1 shows the package wrapping machine in perspective. The main portion of the package wrapping machine 5 is supported upon a lower frame member 13. The lower frame member is of substantial longitudinal extent so as to afford support for the various components of the package wrapping machine. Vertical supports 14 are secured to lower frame member 13 at spaced intervals throughout the length thereof and provide support for two upper horizontal beams 11 and 12. The beams 11 and 12 are spaced on either side of the lower frame member 13 and run throughout the length thereof. The beam 12 and lower frame member 13 provide support for the material cutter and support assembly now to be described.

*Material Cutter and Support Assembly*

The material cutter and storage assembly is designated generally as 60 and is best shown in FIGS. 1 and 2. The material storage and cutter assembly 60 is disposed transversely with respect to the longitudinal extent of the package wrapping machine 5 and abuts thereagainst.

The support frame 61 is secured to the lower frame 13 and to the upper horizontal beam 12 by appropriate fastening means. The support frame 61 is a rectangular-shaped member which supports the various mechanisms now to be described.

Spaced material support brackets 62 and 63 extend from the back side of support frame 61. The material support brackets 62 and 63 support a roll of flexible material 64 which is mounted on a shaft 76 journaled in the material support brackets 62 and 63. The shaft 76 is driven so as to feed the flexible material off the roll without stretching or pulling. The material 64 passes under a floating roller 79 mounted in the frame 61. The floating roller 79 actuates linkage 116 according to the tension applied to the material, which in turn controls a drive box 113. The drive box 113 is arranged to drive the chain 115 at a speed continuously variable from zero to a predetermined maximum, depending on the position of the linkage 116. Thus, the sprocket 114 of shaft 76 is driven by chain 115 at a speed directly controlled by the position of the floating roll 79, and hence by the tension of the material 64. In this manner the shaft 76 is driven as necessary to feed the material 64 at a constant tension.

An arch-shaped cutter head 65 is secured to the top of the support frame 61. An idler shaft 66 (FIG. 2) is rotatably journaled in the cutter head 65. A drum 67 is secured to the shaft to increase the effective diameter thereof. Positioned forwardly of the cutter head idler shaft 66 toward the upper horizontal beam 12 is a cutter head drive shaft 68 also journaled in the cutter head arch 65. A cutter head feed belt 69 is entrained about the drum 67 and drive shaft 68 and is driven by the drive shaft 68. A cutter head knife 70 is mounted on an actuator arm 71 which is pivotally mounted on the cutter head arch 65.

The cutter head arch 65 is mounted on a guide bar 72 and can be moved toward or away from the coupler horizontal frame member 12 by a crank and screw adjustment means 75 mechanically interconnected with the cutter head arch 65. Thus, rotation of the crank and screw member 75 will cause the cutter head arch 65 and knife 70 pivotally mounted thereon, to extend or retract from the horizontal upper beam 12 for purposes which will be explained more fully hereinafter.

A cutter head clamping roll 73 (FIG. 1) is positioned above the drum 67 and sandwiches the material 64 between itself and the cutter head feed belt 69. The material 64 is fed from the stored roll position over director bar 77 and under floating roller 79. The material then passes over idler roller 74 and between clamping roller 73 and the belt 69. The cutter head feed belt 69 carries the flexible material to the cutter blade where it is severed into sheets in a manner to be described more fully hereinafter. The cutting action takes place after a proper length of flexible material is drawn onto the cross-feed assembly now to be described.

*Cross-Feed Assembly*

The cross-feed assembly is designated generally as 80 and is best shown in FIGS. 1 and 2. The cross-feed conveyor assembly 80 extends from and under the cutter head knife 70 to the upper horizontal beam 12 and transversely across the package wrapping machine.

The drive shaft for the cross-feed conveyor assembly 80 is journaled in brackets secured to the upper horizontal frame member 11 (FIG. 2). A cross-feed driving drum 81 is secured to the shaft 88 to increase the effective diameter thereof. An idler roller 82 is positioned below and inwardly from the upper horizontal frame member 11. An upper intermediate idler roller 83 and a lower intermediate idler roller 84 are journaled in the support frame 61 adjacent its connection with the lower frame member 13 and upper horizontal frame member 12. An upper cutter head idler roller 86 is journaled in the cutter head arch 65, positioned adjacent the cutter head feed belt 69. A lower cutter head idler roller 85 is journaled in the support frame 61 and is in horizontal alignment with the intermediate idler roller 84. A tensioning roller 87 is journaled in the support frame 61 intermediate the upper and lower cutter head idler rollers 86 and 85.

A cross-feed conveyor belt 90 is entrained about the cross-feed drive shaft drum 81 and passes over the idler 82 and intermediate idler 83, under the intermediate idler 84 and cutter head idler 85, under the tensioning roller 87 and over the upper cutter head idler roller 86. The cross-feed conveyor belt 90 is provided with a series of perforations 91 through which suction means can draw air to cause the flexible sheet material to adhere to the conveyor belt. The belt 90 may be constructed of any woven-type belt which has a rubber facing to increase friction between the belt surface and the flexible sheet material. The cross-feed belt 90 is positioned with respect to the transfer assembly 25, so that the one edge thereof is disposed adjacent the transfer roller 23 of the assembly 25. This arrangement is best shown in FIG. 3. As seen in FIGS. 1 and 2, the cross-feed conveyor belt 90 moves transversely with respect to the transfer assembly 25 and angle conveyor assembly 30.

A rectangular shaped vacuum box 95 (FIGS. 2 and 3) is positioned inwardly of endless cross-feed conveyor belt 90 and extends in a transverse direction between the upper horizontal frame members 11 and 12. The top of the vacuum box 95 is open and when a blower is attached thereto, air is displaced from the box and drawn through the perforations of the cross-feed conveyor belt so as to cause the flexible material 64 to adhere to the belt.

A telescoping rectangular vacuum box 96 (FIG. 2) fits within an open end of the box 95 and extends under the cross-feed conveyor belt section that is disposed within the material cutter and storage assembly 60. The vacuum box 96 is made to telescope within the vacuum box 95, to allow the cutter head arch 65 to advance and retract toward the upper horizontal beam 12. Thus, the cutter head arch 65 may be moved toward or away from the upper horizontal frame member 12 by the crank and screw adjustment members 75, and the vacuum box 96 always remains within the vicinity of the cutter head blade 70. It is desirable to always provide suction means adjacent the cutter head feed belt 69, to assist in transfer of the flexible sheet material from the cutter head feed belt 69 to the cross-feed conveyor belt 90. The vacuum boxes 95 and 96 are provided with a grid structure 97 (FIG. 3) for supporting the cross-feed conveyor belt 90.

A flange 98 (FIGS. 3 and 8) extends transversely from the vacuum box 95 and is positioned directly under the transfer assembly 25. The flange 98 extends throughout the longitudinal extent of the transfer assembly 25, and has a slot formed therein in which a steel roller drum 27 of the assembly 25 extends above.

The ends of flange 98 surround the ends of this steel roller drum. The one end of this arrangement is shown in FIG. 8. This figure also shows a transfer finger 130 which is secured to the flange end 98 and extends through a notch 29 (FIG. 7) in the bracket 15. The finger 130 is generally triangular in shape, and the base portion thereof lies in the proximity of the end of the steel roller drum and in approximately the same horizontal plane. The apex of the finger is somewhat blunted and cooperates with an auxiliary cross-feed belt now to be described.

The auxiliary cross-feed belt 125 is shown in FIGS 1, 2 and 8. It is a narrow belt which lies adjacent to the cross-feed belt 90 and in the same horizontal plane. It lies adjacent the side of the cross-feed conveyor belt 90 that passes by the transfer assembly 25. The auxiliary cross-feed belt 125 is of the endless type and is entrained over the lower cutter head idler roller 85, under the tension roller 87, and over the upper cutter head idler 86 in the same manner as the cross-feed conveyor belt 90. The auxiliary cross-feed belt is also entrained over idlers 127 and 128 which are positioned adjacent one end of transfer assembly 25 in vertically spaced alignment. Thus, the auxiliary cross-feed belt terminates adjacent one end of transfer assembly 25 and the cross-feed conveyor belt 90 extends transversely across the width of the packaging machine 5 as described above.

The auxiliary cross-feed belt 125 has a groove 126 (FIG. 8) centrally disposed in the outer surface thereof, and extending throughout its longitudinal length. The groove 126 receives the apex of transfer finger 130. With this arrangement the transition of the flexible material 64 from the auxiliary cross-feed belt 125 onto the transfer finger 130 can be made with no hiatus between them.

Figure 7:
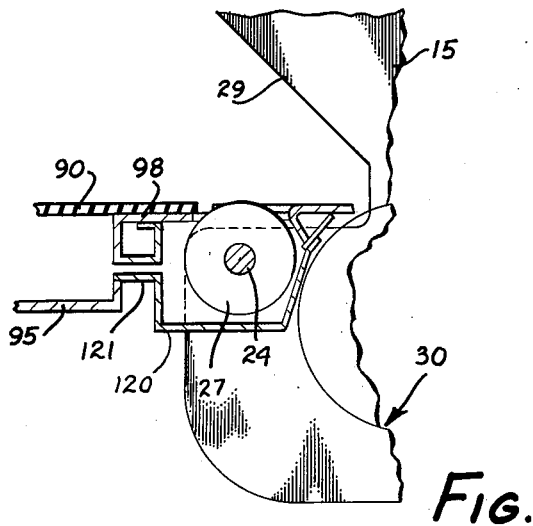
FIG. 7 is a segmental cross sectional view of a modified form of the lower portion of the transfer assembly.
Figure 8:
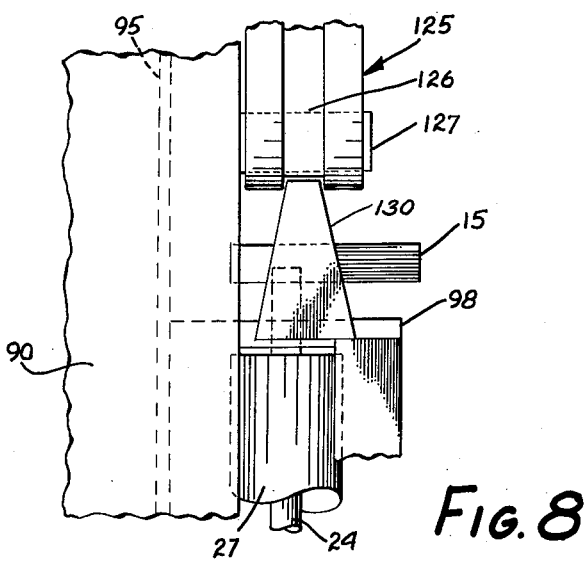
FIG. 8 is a segmental plan view showing the relationship of the auxiliary cross-feed belt, transfer finger and support roller.

FIG. 7 shows a modified form of the invention wherein a vacuum is also applied to area surrounding the steel roller drum 27. As previously described a portion of steel roller drum 27 extends through and above the slot formed in flange 98. There is a clearance between the steel roller drum and the edges of the slot wherein air can pass (FIG. 7). A vacuum trough 120, having a troughlike shape, is secured to the flange 98 by conventional fastening means, and surrounds the lower part of the steel roller drum 27. A conduit 121 connects the vacuum trough 120 with the vacuum box 95, so that when air is displaced from the vacuum box 95 it is also displaced from the vacuum trough. Thus vacuum is also applied to the flexible material when it is being worked upon by the transfer assembly 25.

The cross-feed conveyor assembly 80, the auxiliary cross-feed belt 125, and the transfer finger 130 transport the flexible material to the transfer assembly 25 now to be described.

*Transfer Assembly*

The mounting of the transfer mechanism 25 is best shown in FIGS. 2 and 6. L-shaped brackets 15 and 16 are secured to the horizontal beams 12 and 11, respectively, by appropriate fastening means. The transfer mechanism 25 is pivotally suspended from the brackets 15 and 16 by a carriage drive shaft 18. The carriage drive shaft 18 is journaled in the brackets 15 and 16 as shown in FIG. 6.

The transfer assembly 25 includes a carriage consisting of end members 17 and 17a and a tie bar 19 which secures the end members together. The end members 17 and 17a are pivotally mounted on the shaft 18 adjacent the brackets 15 and 16 and the tie bar 19 which connects the end members extends substantially throughout the length between the brackets 15 and 16.

The carriage end members 17 and 17a contain journals for the transfer roller shaft 22 which is rotatably mounted therein. The transfer roller shaft 22 is covered with a high carton rubber shell 23 which engages the flexible sheet material for movement thereof. The shell 23 extends throughout the distance between the carriage ends 17 and 17a, as shown in FIG. 2, and is provided with a series of grooves 26 disposed at equally spaced intervals throughout the length thereof. The transfer roller 23 is driven in a manner to be described subsequently.

A steel roller having a shaft 24 and drum 27 is journaled on the brackets 15 and 16 directly beneath the transfer roller 23. The outer periphery of the roller drum 27 is in the same horizontal plane as the belt of the cross-feed assembly 80, and cooperates with the transfer roller 23 in moving the flexible material 64 from the cross-feed assembly.

A transfer idler roller 110 (FIGS. 3 and 6) is journaled in bearing supports 111 secured to the brackets 15 and 16 or to the horizontal beams 11 and 12. Transfer roller belts 112 are disposed in the grooves 26 formed in the transfer roller 23 and entrained over the transfer idler roller 110. The grooves 26 of the transfer roller 23 are of sufficient depth so that the transfer roller belts 112 are depressed below the outside surface of the roller 23 so as not to interfere with the operation of the transfer roller. However, the idler roller 110 is positioned so that after the belts 112 leave the transfer roller 23 they come into contact with the flexible material being transported. The belts then operate to move the flexible material if it tends to stick to the transfer roller 23.

As previously mentioned, the transfer assembly is pivotally mounted on carriage drive shaft 18. The carriage is lifted periodically by cam mechanism (FIG. 6) now to be described. A cam drive shaft 59 is journaled in the horizontal support beam 12, and is provided with a cam 58 secured thereto. A lifter arm 56 is secured to the carriage end member 17a and extends therefrom. The lifter arm 56 has a cam follower 57 which engages the cam 58. The cam 58 is rotated continuously, and at a given point in the cycle raises lifter arm 56 which pivots the carriage about shaft 18, and raises transfer roller 23 from its position adjacent steel roller drum 27. The purpose for the raising and lowering of transfer roller 23 will be described in greater detail hereinafter.

As seen in FIG. 3, suspension brackets 20 are secured to the underside of tie beam 19. A shaft 21 is journaled in the suspension brackets 20. The shaft 21 is provided with several equally spaced hold down rings 28 secured thereto. The hold down rings 28 engage the flexible material as it is being transferred onto the angle conveyor assembly 30. The rings make light contact with the belt of the angle conveyor assembly 30 and are rotated thereby, assisting in holding the flexible material in contact with the belt and drawing it thereon.

*Transfer Conveyor Assembly*

The angle or right angle conveyor assembly 30 (FIGS. 3, 4 and 5) is also pivotally mounted on the brackets 15 and 16, for a purpose hereinafter described, by the angle conveyor drive shaft 31 (FIG. 3) which is journaled in the brackets. The conveyor drive shaft 31 has a drum 32 secured thereto to increase the effective diameter thereof. The angle conveyor means has side rails 38 and 39 which provide framework for directing the path of travel of an endless belt 33. The side rails 38 (FIG. 4) and 39 (FIG. 5) have journals 40 (FIG. 4) which engage the shaft 31 and pivotally mount the conveyor means on the shaft. The opposite end of the side rails are tied together by an idler shaft 41. The idler shaft drum 42 is rotatably mounted on the idler shaft 41 and extends between the side rails 38 and 39. The drive shaft drum 32 also extends between the side rails 38 and 39.

The angle conveyor belt 33 is an endless belt and is entrained about the drive shaft drum 32 and idler drum 42. The angle feed belt 33 is provided with a series of perforations 37 in a manner similar to the cross-feed conveyor belt 90. The angle feed belt 33 is also constructed of similar material to that of the cross-feed conveyor belt 90.

The surface of the belt may be provided with longitudinal grooves that assist the packaging apparatus in removing the flexible material therefrom as will be explained later.

FIG. 5 shows a belt tensioning drum 43 which is mounted between the side rails 38 and 39 adjacent the idler drum 42. Adjustment slots 45 are provided in the side rails 38 and 39 to provide for movement of drum 43 or tensioning the belt 33. Adjustment means 44 secures the drum 43 in position when the proper tension has been applied to the belt 33. Actuator rods 46 (FIGS. 1 and 5) are secured to the angle conveyor side rails 38 and 39 and are connected to actuating mechanism (not shown) to cause the angle conveyor means 30 to pivot about the shaft 31 for reasons which will be explained more fully hereinafter.

The side rails 38 and 39 also form the sides of the vacuum chamber disposed between the angle conveyor belt 33. FIG. 4 shows the vacuum pan 34 which is secured to the side rails 38 and 39 by means such as welding. The vacuum pan 34 closes the bottom and ends of the chamber. An expanded metal grid 36 is supported by the side rails 38, 39 and pan 34. The angle conveyor belt 33 passes over the guide 36 (FIGS. 3 and 4) and is supported thereby. A flexible blower hose (not shown) is connected to the outlet 35 formed in rail 38. During operation air is drawn from the chamber, and through the perforations 37 and grid 36, the displacement causing a suction on the flexible material being carried by the angle conveyor belt.

*Power Train for Transfer and Angle Conveyor Assemblies*

FIG. 6 shows a schematic view in plan of the power train for the angle conveyor and transfer assembly 25. The timing belt drive pulley 50 is fixedly secured to the shaft 31 in any conventional manner. The shaft 31 extends through its journal in the bracket 16 and projects sufficiently therebeyond to accommodate the timing belt drive pulley 50 and also a drive pinion 51 which is keyed to the shaft 31 in a conventional manner. The carriage drive shaft 18 also extends through its journal in the bracket 16 and projects in a manner similar to the angle conveyor drive shaft 31. A carriage pinion 52 is keyed to the carriage drive shaft 18 by conventional key means and is positioned so as to be aligned with the drive pinion 51 and meshes therewith.

A combination carriage pulley and overrunning clutch 53 is positioned at the opposite end of carriage drive shaft 18 between the carriage end 17a and the bracket 15. A transfer drive pulley 54 is secured to the end of the transfer roller drive shaft 22 which projects beyond its journal in the carriage end 17a. The transfer drive pulley 54 is aligned with the carriage pulley and overrunning clutch 53 and a drive belt 55 is entrained over the pulleys to convey the motion of carriage drive shaft 18 to the transfer roller shaft 22.

The timing belt drive pulley 50 is connected by an appropriate drive belt to timing mechanism connected to the main drive shaft of the mechanism (not shown). Thus, the shaft 31 is rotated by the mechanism (not shown) and connected to the timing belt drive pulley 50. Rotation of the angle conveyor drive shaft 31 causes rotation of the drum 32 affixed thereto, and movement of the angle conveyor belt 33 which is entrained thereover. Rotation of angle drive shaft 31 also causes rotation of pinion 51 which is affixed thereto. Since pinion 51 meshes with carriage pinion 52, the rotation will also be imparted to carriage drive shaft 18. The rotation of shaft 18 is conveyed through carriage pulley and overrunning clutch 53, via the belt 55 to the transfer drive pulley 54 and to transfer roller drive shaft 22.

The carriage pulley and overrunning clutch 53 impart rotation to the transfer roller shaft 22 only when the shaft 31 is rotating in the forward direction. When the shaft 31 rotates in the reverse direction, the carriage pulley and overrunning clutch 53 will not be rotated, due to the overrunning mechanism (not shown) of the combination carriage pulley and overrunning clutch 53. Thus, the carriage pulley and a portion of the overrunning clutch remain idle when the angle drive shaft 31 rotates in the reverse direction, and causes reverse rotation of the carriage drive shaft 18. The reason for this will be explained more fully in the operation of the transfer mechanism and the packaging mechanism elevator 100 now to be described.

An elevator 100 is disposed at the discharge end of angle conveyor assembly 30. This is best shown in FIG. 5. The elevator 100 has a series of gripper fingers 101 which are disposed at equally spaced intervals in front of the width dimension of angle conveyor belt 33. These fingers correspond in spacing to the longitudinal grooves formed in angle conveyor belt 33 so that the transition of the flexible material from the belt 33 to the gripper fingers 101 can be made without a hiatus. The fingers 101 are carried by a rod 104 which is secured to an actuating arm 102. The flexible sheet material 64 as it leaves the angle conveyor belt 22 is grasped by the fingers 101 and clamped between the fingers 101 and a gripper bar 103. The flexible sheet material 65 is held by the fingers 101 and gripper bar 103 as the elevator 100 is lowered for purposes to be explained more fully hereinafter.

*Operation*

The specific drive trains for the various parts will not be described in detail, since they are of conventional construction. Furthermore, the specific control mechanism for controlling the movement of the various drive trains will not be explained in detail, since the mechanism may be controlled mechanically, electrically, pneumatically or by a combination of these means. FIG. 9 shows a diagram of the sequential operation of the various components of the sheet transport assembly 10.

When the machine 5 is placed into service, the material cutter and storage assembly 60 is provided with a roll of flexible material 64. The material 64 is passed over director bar 77, under floating roller 79, behind director bar 78, over cutter head idler roller 74, and placed between head feed conveyor belt 69 and cutter head tension roller 73. The package wrapping machine 5 is provided with articles to be wrapped (not shown) and the machine is ready for operation.

Upon energization of the package wrapping machine the various components of the assembly function during a cycle of operation for a wrapping cycle in a manner now to be described. As shown in FIG. 9, the operation intervals of the various components are of one-fourth or one-half cycle duration.

During the first half of the cycle, a drive train mechanism (not shown) rotates the cross-feed conveyor drive shaft 81 and drum 82 to cause movement of the cross-feed conveyor belt 90 and rotation of the cutter head drive shaft 68 and cutter feed belt 69. The auxiliary cross-feed belt 125 is also rotated during this interval, this belt being driven by the idlers 85, 86 and 87 of the cross-feed conveyor assembly 80, since it is entrained thereover. The knife or cutter 70 is inoperative during this interval to avoid cutting the strip 64 while it is moving. A blower mechanism (not shown) remains energized at all times while the machine is in operation to provide a continuous suction to the cross-feed belt 90 which is passing over the vacuum boxes 95 and 96, as well as to the angle conveyor belt 33 which passes over the vacuum box 34. The cross-feed conveyor belt 90 and auxiliary cross-feed belt 125 are driven at a greater peripheral speed than the cutter head feed belt 69. The greater peripheral speed of the cross-feed conveyor belts in combination with the suction applied thereto prevents the edge of the highly flexible material from buckling as it moves off the cutter head feed belt 69. Instead, the edge of the flexible material 64 tends to be straightened by the greater speed of cross-feed conveyor belts and is caused to adhere to the cross-feed conveyor belt 90 due to the suction means applied thereto. During the feeding of the material 64, the shaft 76 is driven by drive box 113, as controlled by floating roller 118, at a speed such as to apply to the material 64 a constant tension sufficient to keep the material taut but insufficient to cause the material to stretch out of shape.

During the second one-half of the cycle, the cross-feed conveyor belt 90, its auxiliary belt 125, and the cutter head feed belt 69 are stationary. While the cross-feed conveyor belts and the cutter head feed belt 69 are stationary, appropriate mechanism (not shown) operates the knife 70 at any desired time during the interval designated as "Knife Operative" in FIG. 9, cutting the flexible material 64 to form a sheet. The length of the sheet is determined by the speed and time interval of operation of the cutter head feed belt 69. If this belt operates for a considerable length of time, a long piece of material will be drawn onto the cross-feed belt 90, and if it operates for a short time only, a short piece of flexible material will be drawn out onto the cross-feed conveyor belts. The duration of operation of these parts can be controlled mechanically, electrically or by other appropriate means, and it may or may not equal the duration of movement of the cross-feed belts, as long as the cutter head feed belt operates only while the cross-feed belts are moving. In a preferred embodiment of this invention, the length of sheet cut is controlled by a variable stroke reciprocating drive. Assuming the package wrapping machine 5 is initially completely out of sheets, the above sequence takes place during the first cycle of operation.

During the second cycle of operation, the above series of events repeats itself. However, there is now a flexible sheet on the cross-feed conveyor belt 90 and its auxiliary belt 125 and during the first half of the second cycle of operation, while the cross-feed conveyor belts are moving, the flexible sheet that has been cut will be carried by the cross-feed conveyor belt 90 to the transfer assembly 25. The auxiliary cross-feed conveyor belt 125 supports the edge of the flexible material which eventually assumes a position between the steel roller drum 27 and transfer roller 23. The auxiliary cross-feed belt 125 terminates at the edge of bracket 15, and the transfer finger 130 then supports this edge of the flexible material until it is positioned on the steel roller drum 27. The steel roller drum 27 and flange 98 then support the edge of the flexible material for the remainder of its travel on the cross-feed belt. The movement of cross-feed conveyor belt 90 is so adjusted that when the cross-feed conveyor belt 90 stops during the second half of the cycle, the sheet of flexible material will come to rest directly in front of the transfer assembly 25.

The crank and screw adjustment device 75 is used to position the cutter head arch 65, and in turn the knife 70, in a longitudinal direction with respect to cross-feed belt 90 in such a manner that the cut sheet of flexible material 64 will become positioned on belt 90 in such a manner that the sheet will come to rest in a position exactly centered with respect to the transfer assembly 25 when the cross-feed conveyor belt 90 stops. The sheet will thereby also be exactly centered with respect to the elevator 100 of the packaging apparatus. This adjustment is necessary each time the length of the sheet is varied. Thus, during the first half of the second cycle, the original sheet has been conveyed to a centered position in front of the transfer assembly 25 and a new piece of material is drawn onto the cross-feed conveyor belt 90 and its auxiliary belt 125.

Since a sheet is now centered in front of the transfer assembly 25, it can be transferred during the second half of the second cycle. An appropriate power train causes rotation of the timing belt drive 50 which in turn drives the pinion 51 and carriage pinion 52. This rotates shaft 18 which in turn rotates the carriage pulley and overrunning clutch 53, causing belt 55 to rotate transfer drive pulley 54 which is in turn secured to the transfer roller 23. The shaft 18 is rotating in the forward direction so that the one-way clutch is energized. At the same time, appropriate drive mechanism has positioned the cam 58 so that the transfer roller 23 engages the flexible sheet between itself and steel drum roller 27. Since the timing belt drive pulley 50 has been energized, angle conveyor drive shaft 31 and its drum 32 has been energized causing forward movement of the angle conveyor belt 33. The surface speed of angle conveyor belt 33 is greater than the peripheral speed of transfer roller 23 due to a difference in gearing. The reason for the difference in speed is the same as the reason for the difference in speed between the cross-feed belt conveyor 90 and the cutter head feed belt 69, to-wit, the prevention of buckling or wrinkling of the flexible material as it passes from the cross-feed conveyor belt 90 onto the angle conveyor belt 33. The transfer assembly 25 and angle conveyor assembly 30 operate during the third quarter of each cycle. During the interval the flexible sheet is moved by the transfer roller 23 and pulled onto the angle conveyor belt 33 from the cross-feed conveyor belt 90. The angle conveyor belt 33 carries the flexible sheet to the elevator 100. Thus, the leading edge of the flexible sheet is gripped by the grippers 101 and held against the gripper bar 103.

The transfer assembly 25 and angle conveyor means 30 are stationary during the final quarter of each cycle. However, during this interval the cam 58 rotates and causes the follower 57 and arm 56 to pivot the transfer roller 23 out of engagement with the steel roller drum 27.

During the last quarter of the cycle, the elevator 100 is lowered by an appropriate mechanism (not shown). Since the flexible sheet material is gripped between the fingers 101 and bar 103 and the angle conveyor belt 33 is now stationary, the flexible sheet material will be drawn partly off the angle conveyor belt 33. Two full cycles have now been completed.

As the third cycle starts, the third sheet of material is measured out by the cutter head feed belt 69. The second sheet of flexible material is moved by the cross-feed conveyor belts to the transfer point at the transfer assembly 25. This occurs during the first half of the third cycle.

During the first quarter of the third cycle, the elevator 100 is in its lowermost position and the package to be wrapped is pushed into position from the platform 105 onto the elevator 100 by an appropriate mechanism (not shown). As the package is conveyed onto the elevator, the leading edge of the flexible sheet material is drawn from between the gripper fingers 101 which have in the meanwhile released their gripping contact. This folds the flexible sheet material under the package as it moves onto the elevator 100, the leading edge of the sheet coming to rest near the center of the package bottom.

During the second quarter of the third cycle, the elevator is rising. Also during this quarter of the third cycle, the angle conveyor belt 33 is driven in the reverse direction to keep the flexible sheet material taut on the angle conveyor belt 33 as the elevator rises. This is done by applying reverse drive to the timing belt drive pulley 50 which in turn reverses the direction of rotation of shaft 31 and its drum 32 to drive the angle conveyor belt 33 in the reverse direction. Thus, the angle conveyor belt 33 moves in a direction which attempts to pull the flexible sheet material away from the package which is resting upon it. Inasmuch as the frictional force which holds the sheet of material 64 to the belt 33 is much smaller than the force which holds the sheet between the package and the elevator, the sheet is kept taut and is gradually pulled off the belt 33 but is not pulled out from under the package. Eventually the elevator will reach its uppermost position, and will have pulled the flexible sheet completely out of contact with the angle conveyor belt 33. This movement causes the sheet to become placed over the top of the package and to hang down in front of it. The package is now surrounded on three sides by the flexible material, and conventional wrapping mechanism then completes the wrapping of the package. The angle conveyor assembly 30 follows the raising and lowering of the elevator by pivoting about drive shaft 31 but at a slower rate. Thus, by the time the gripper fingers 101 are ready to receive the flexible sheet material during the third quarter of the cycle, the elevator 100 and angle conveyor assembly 30 are in alignment so that the fingers 101 may receive the sheet material.

From the above description, it can be seen that it takes two and one-half cycles of the machine to complete the wrapping of the package after the first sheet of flexible material is fed from the storage roll. However, once the machine is in operation, a complete sequence of events, as shown in FIG. 9, takes place during each complete cycle. Thus, flexible material is fed or transferred to the various stations of the packaging machine and a package is wrapped during each cycle of operation.

It will be seen that a sheet transfer assembly has been disclosed herein which is particularly adapted to transfer sheets of a highly flexible or pliable nature. This is accomplished by suction conveyor means which in effect pull the sheet in each phase of its travel. Thus, highly flexible sheets are now usable in automatic package wrapping machines which were previously unusable due to their tendency to wrinkle and buckle. Thus, applicant's sheet transfer assembly provides a means whereby many of the new, highly flexible plastic materials can be used in place of previously known stiffer type wrapping materials. These new plastic wrapping materials can be purchased at a fraction of the cost of previous wrapping materials; therefore, with the use of a sheet transfer assembly as disclosed herein, packages can be wrapped more economically, yet more attractively, than originally was possible. The transfer assembly of this invention can be used in a wholly automatic package wrapping machine and is, therefore, adaptable to high speed wrapping operations. However, it should be understood that while the invention has been described herein in its application to a package wrapping machine for purposes of illustration, it is equally applicable to any type of operation involving the transportation of highly flexible sheet material. Consequently, and also because many different embodiments of the invention could be devised even for the same application, depending on the requirements of individual machines, the invention is not intended to be limited to the embodiment described but is defined only by the scope of the appended claims.

I claim:

1. A method of transporting a sheet of highly pliable material over a nonlinear path comprising the steps of placing said sheet on a first conveying means, applying suction to said conveying means to hold said sheet thereagainst, moving said conveying means in a first direction to carry said sheet to a predetermined transfer point, pulling said sheet off said first conveying means at said transfer point and discharging said sheet onto a second conveying means, applying suction to said second conveying means to hold said sheet thereagainst, and moving said second conveying means in a second direction at a speed greater than the speed at which said sheet is being pulled off said first conveying means.

2. A device for transporting a sheet of highly pliable material along a nonlinear path, comprising a first perforated belt, means for moving said belt in a first direction, means for depositing said sheet on said belt, transfer means alongside said belt for grasping an edge of said sheet and pulling said sheet laterally off said belt, a second perforated belt said transfer means being arranged to discharge said sheet onto said second perforated belt, means for moving said second belt in a second direction, and vacuum means for imparting a suction action to the surfaces of both said belts.

3. A package wrapping machine comprising a storage roll for highly stretchable packaging material, a cutting device for cutting said material into sheets, means for causing said storage roll to be driven at a variable speed so as to discharge said material under a substantially constant predetermined tension, and means for conveying said sheets to a package wrapping station and wrapping said sheets around packages.

4. A package wrapping machine comprising means for conveying a sheet of highly pliable wrapping material to a package wrapping station for wrapping a package therewith, said means including a perforated belt for conveying said sheet, vacuum means for causing said sheet to adhere to said belt, means at said wrapping station for pulling said sheet off said belt, and a drive mechanism for moving said belt in a reverse direction to tension said wrapping material while said last-named means are pulling said sheet off said belt.

References Cited in the file of this patent

UNITED STATES PATENTS

| | | |
|---|---|---|
| 1,545,910 | Maxson | July 14, 1925 |
| 1,640,108 | Broadmeyer | Aug. 23, 1927 |
| 1,761,771 | Brownell | June 3, 1930 |
| 1,981,470 | Rundell et al. | Nov. 20, 1934 |
| 2,101,170 | Engel | Dec. 7, 1937 |
| 2,425,210 | Stokes | Aug. 5, 1947 |
| 2,852,256 | Faulls et al. | Sept. 16, 1958 |
| 2,945,337 | Waite | July 19, 1960 |
| 2,949,002 | Swarycz | Aug. 16, 1960 |